United States Patent

Bosomworth

[15] 3,700,791

[45] Oct. 24, 1972

[54] CHARACTER GENERATOR UTILIZING A DISPLAY WITH PHOTOCHROMIC LAYER

[72] Inventor: Douglas Robert Bosomworth, Hightstown, N.J.

[73] Assignee: RCA Corporation

[22] Filed: Oct. 15, 1969

[21] Appl. No.: 866,489

[52] U.S. Cl. ....................178/6.8, 178/7.5, 178/7.85, 178/DIG. 31, 313/91, 340/324 A, 350/160 P

[51] Int. Cl. ..............................H04n 7/18, G02f 1/36

[58] Field of Search ..340/324 A; 313/91; 350/160 P; 178/7.85, 7.30, 7.50, 6.8, DIG. 31; 95/4.5

[56] References Cited

UNITED STATES PATENTS

| | | | |
|---|---|---|---|
| 3,148,281 | 9/1964 | Fyler | 313/91 |
| 3,253,497 | 5/1966 | Dreyer | 178/6 PC |
| 3,389,219 | 6/1968 | Stetten | 178/6 PC |
| 3,395,246 | 7/1968 | Stetten | 178/6.8 CR |
| 3,345,459 | 10/1967 | Dudley | 178/6 PC |
| 3,349,172 | 10/1967 | Mauchel | 340/324.1 |
| 3,519,742 | 7/1970 | Bjelland | 178/6 PC |

*Primary Examiner*—Robert L. Griffin
*Assistant Examiner*—Joseph A. Orsino, Jr.
*Attorney*—H. Christoffersen

[57] ABSTRACT

A photochromic cathode ray storage tube and means for optically projecting onto the photochromic screen of said tube any one of a number of different fonts. Any character in the font subsequently may be read out and displayed by scanning the electron beam of the storage tube over the portion of the screen storing the character, sensing the light produced during the scanning, and intensity modulating the screen of a display means, such as a concurrently scanned display kinescope, in response to the light which is sensed. The location and size of the area of the display means at which the character is to be displayed may readily be controlled. The font may easily be changed by erasing the one stored and then optically projecting a new font onto the same photochromic screen.

9 Claims, 8 Drawing Figures

INVENTOR.
DOUGLAS ROBERT BOSOMWORTH
BY H. Christoffersen
Attorney

| | $2^0$ | $2^1$ | $2^2$ | $2^3$ | $2^4$ | $2^5$ | $2^6$ | PARITY |
|---|---|---|---|---|---|---|---|---|
| CHARACTER A | 1 | 0 | 0 | 0 | 0 | 0 | 1 | 0 |
| | | | | | | | | |
| HORIZONTAL 46 | 0 | 1 | 1 | 1 | 0 | 1 | 0 | 0 |
| | | | | | | | | |
| VERTICAL 50 | 0 | 1 | 0 | 0 | 1 | 1 | 0 | 1 |

INVENTOR.
DOUGLAS ROBERT BOSOMWORTH
BY H. Christofferson
Attorney

INVENTOR.
DOUGLAS ROBERT BOSOMWORTH
BY H. Christoffersen
Attorney

INVENTOR.
DOUGLAS ROBERT BOSOMWORTH
BY H. Christoffersen
Attorney

INVENTOR.
DOUGLAS ROBERT BOSOMWORTH
BY H. Christoffersen
Attorney

CHARACTER GENERATOR UTILIZING A DISPLAY WITH PHOTOCHROMIC LAYER

BACKGROUND OF THE INVENTION

This invention was first conceived in the course of a contract with National Aeronautics Space Administration.

There are numerous applications in the data processing field for systems for supplying for display purposes, data such as letters, numbers, symbols, lines, maps and so on. Such systems are generally known in the art as "character generators." While there are many forms of such generators including stroke writers, monoscope writers and so on, all with their own strong and weak characteristics, a disadvantage common to such systems is the relative difficulty of changing fonts.

In the generators employing a monoscope, if more than one font is needed, more than one monoscope is employed and additional coupling or switching circuits are needed. In character generators utilizing either the stroke or dot matrix approach, additional circuits and memory must be employed for generating additional fonts. In these and other cases, this leads to additional system complexity and expense.

It is the object of this invention to produce a new and improved character generator which is relatively simple and inexpensive and in which both the font and character size readily may be changed.

BRIEF SUMMARY OF THE INVENTION

A storage type cathode ray tube is formed with a face capable of optically storing a font optically projected thereon and including means for raster scanning the electron beam thereof over any character stored in the font. Included are a plurality of masks formed with different fonts. Means are included for projecting light through the mask having the desired font onto the face for causing the font to be stored. Also included are light sensing means for receiving light from the face when a character in the font stored in the face is raster-scanned by the electron beam.

DETAILED DESCRIPTION

Figure 1:
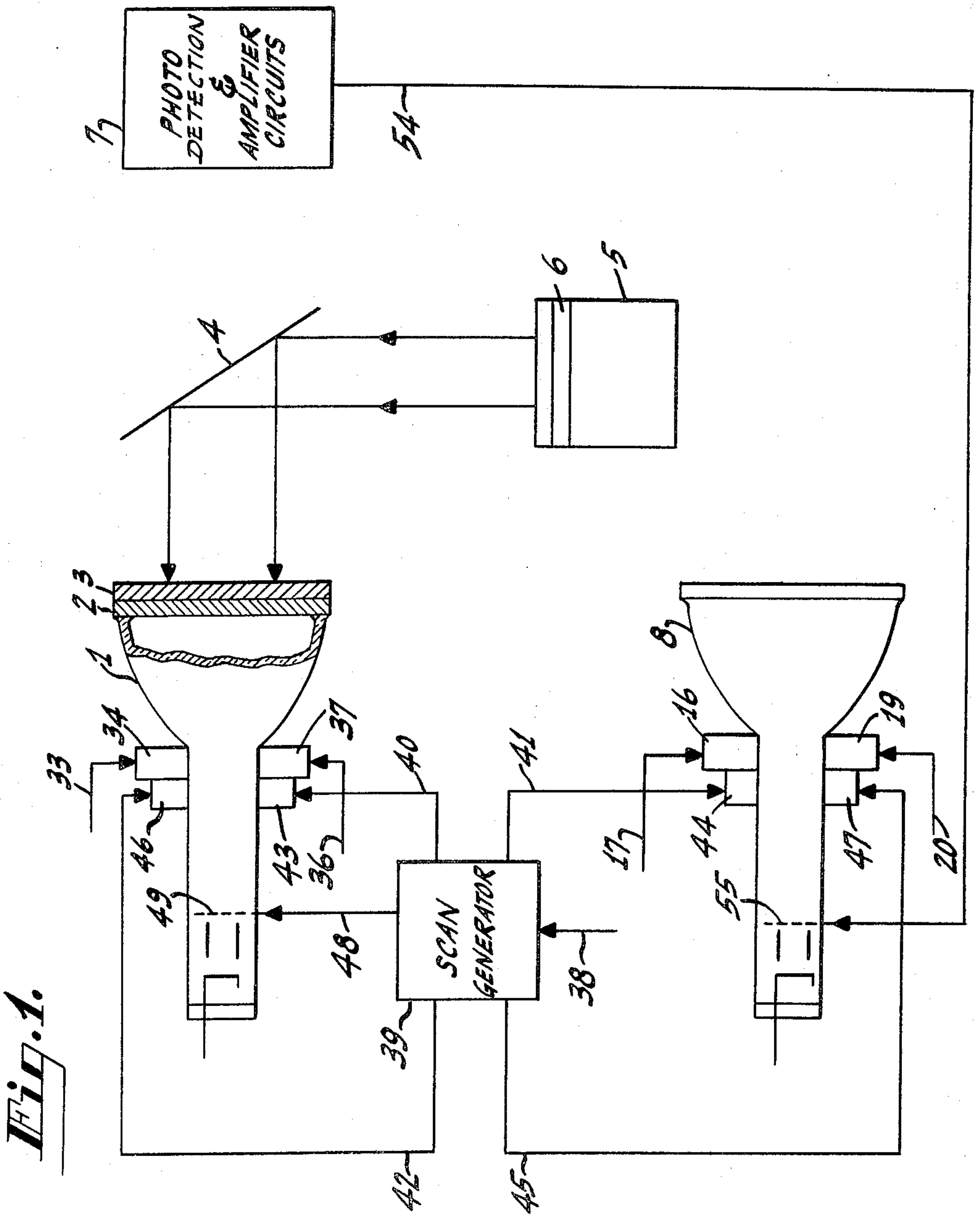
FIG. 1 is a schematic and block diagram embodying the invention.

FIG. 1 illustrates a character generator whose font of characters may be quickly changed. It comprises a display or storage device such as a cathode ray tube 1 having a face comprising at least two layers, the characters being stored on the outer layer.

The inner layer 2 is comprised of material which, when excited by an electron beam, emits radiant energy in a first frequency band. The material, for example, may be a phosphor. The phosphor should be fast in the sense that the phosphor decay time should be somewhat less than the time needed to scan a resolution element of a character stored on the outer layer of the cathode ray tube. At typical TV scanning rates, the phosphor decay time would have to be approximately $10^{-7}$ seconds. One phosphor having this capability is the well-known P16 phosphor ($CaMgSiO_3$:Ce) which emits radiant energy, when excited, in a band approximately 800 A wide and centered at 3,800 A. Another fast phosphor is yttrium aluminum garnet crystals doped with cerium (YAG:Ce), which emits radiant energy, when excited, in a band centered at approximately 5,700 A and 1,200 A wide.

The outer layer 3 is comprised of a material that is transparent but becomes colored or opaque when excited by radiant energy in a second frequency band including, in the colored or opaque area, an absorption frequency in the first frequency band. Photochromic material exhibits such characteristics. A photochromic material is one which changes in transparency through the absorption of radiant energy.

One photochromic which may be used in the practice of this invention is calcium fluoride $CaF_2$ material comprised of $CaF_2$ crystals doped with rare earths such as Ce, La, Tb, or Gd. These materials are normally transparent in the visible spectrum. When exposed to ultraviolet light, 3,500–4,000 A, they become colored or opaque and develop an absorption band in the 5,000–6,000 A region. Other suitable photochromic materials are appropriately doped $SrTiO_3$, $CaTiO_3$ or sodalite.

There are several methods of writing or storing characters on the photochromic layer 3 of the cathode ray tube 1. One such method is the use of a dichroic mirror 4 and a character writer or source of radiant energy 5. The source 5 may have an aperture 6 into which one of a plurality of masks, formed with different fonts, may be inserted. The writer is like a slide projector in that it also contains optics to focus the font mask onto the photochromic layer 3. The dichroic mirror 4 is selected to reflect radiant energy in the band 3,500–4,000 A while transmitting light at 5,000 to 6,000 A.

Dichroic mirrors are essentially interference filters with color-selective reflection and transmission characteristics. By appropriate adjustment of the layer thicknesses of the interference filter, a wide range of spectral responses may be attained. For example, the dichroic mirror may be made by evaporating alternate layers of high and low index of refraction materials such as cryolite and zinc selenide (ZnSe). The thickness of each layer is a particular fraction or multiple of the wavelength at which the reflective-to-transmissive transition must occur. The principles which determine the required layer thicknesses and the number of layers required to achieve a particular dichroic characteristic are well-known in the art. An early work on the subject is "A New Dichroic Reflector and Its Application to Photocell Monitoring Systems" by G.L. Dimmick, *J. Soc. Motion Picture Engineers*, Vol. 38, pp. 36–55, 1942. The physics applicable to dichroic mirrors is contained in "Optical Properties of Thin Solid Films" by O.S. Heavens, *Dover Press*, Ch. 7, 1955.

The cathode ray tube's outer layer 3 is formed of $CaF_2$:La and the inner layer 2 is formed of YAG:Ce.

A selected mask is inserted in the aperture 6 and ultraviolet light is projected through it and reflected from the face of the dichroic mirror 4 onto the photochromic layer 3 where the font is written. The font is stored as colored or opaque characters or symbols on a transparent background if the mask is opaque and the symbols thereon are transparent, whereas the font is stored as transparent characters on a colored or opaque background if the mask is transparent and the characters thereon are opaque. The stored characters or symbols have an induced frequency band of 5,000–6,000 A in the colored or opaque area. A character is read by scanning the electron beam of the cathode ray tube 1 across the phosphor behind the character selected, whereby the excited phosphor emits radiant energy in a band of 5,000–6,000A. The radiant energy emitted by the phosphor is substantially absorbed in the colored area of the character and transmitted through the transparent area, and through the dichroic mirror 4 to a light sensing means such as the photodetection and amplifier circuit 7. The ultraviolet projection source can be turned off during reading or it may be left on to continuously maintain the contrast of the stored font when using a dichroic mirror. The circuit 7 translates the radiant energy to an electrical signal which may be transmitted to a storage device or another display device.

For example, the electrical signal indicative of the character selected may be used to energize a display device, such as the cathode ray tube 8, whereby the selected character is displayed on the face thereof.

An alternative method of storing a font on the photochromic layer 3 of the tube 1 is to project ultraviolet light uniformly over the layer 3 whereby the entire surface thereof becomes colored or opaque. High intensity radiant energy in the band of 5,000–6,000 or visible light is projected through a mask, whereby the font is bleached on the photochromic layer 3. This requires an energy level of 50 to 500 millijoules per square centimeter depending on the particular photochromic material used. The font, therefore, is transparent on an opaque or colored background. The selected character is read in the same manner as described above, except that the signal sensed by the circuit 7 is the complement of the signal sensed when the font was colored on a transparent background.

A movable silvered mirror may be used in place of the dichroic mirror 4. In such an embodiment, the silvered mirror is mechanically moved from the transmission path between the cathode ray tube 1 and the photodetection and amplifier circuits 7, after the font has been stored. This eliminates the transmission loss inherent in some dichroic mirrors. This loss, however, is negligible if a high quality dichroic mirror is used.

A particular character may be read many thousand times before the font needs to be refreshed. For some materials, the font need be refreshed but once a day, and for other materials the storage period may be even longer.

The font may readily be changed by bleaching the colored areas of the photochromic layer with high intensity light in the visible spectrum, 5,000–6,000 A band for the materials set forth above, or by applying heat if other photochromic materials are used. A new font is then stored by one of the methods discussed above.

Any of a number of methods may be utilized for selecting particular stored characters to be used for display or storage in another device. One such method is to be described, for purposes of illustration; however, it is understood that the invention is not limited to the one method. For example, a computer could select certain characters stored in the described character generator for display on another display device. The computer would supply two pieces of information for each character or symbol displayed, namely the character selected from the plurality of characters stored on the photochromic layer of the cathode ray tube 1, and the location where the selected character is to be located on the display device, cathode ray tube 8. This requires three words of information from the computer. That is, the character plus its two display coordinates.

Figures 2, 3:
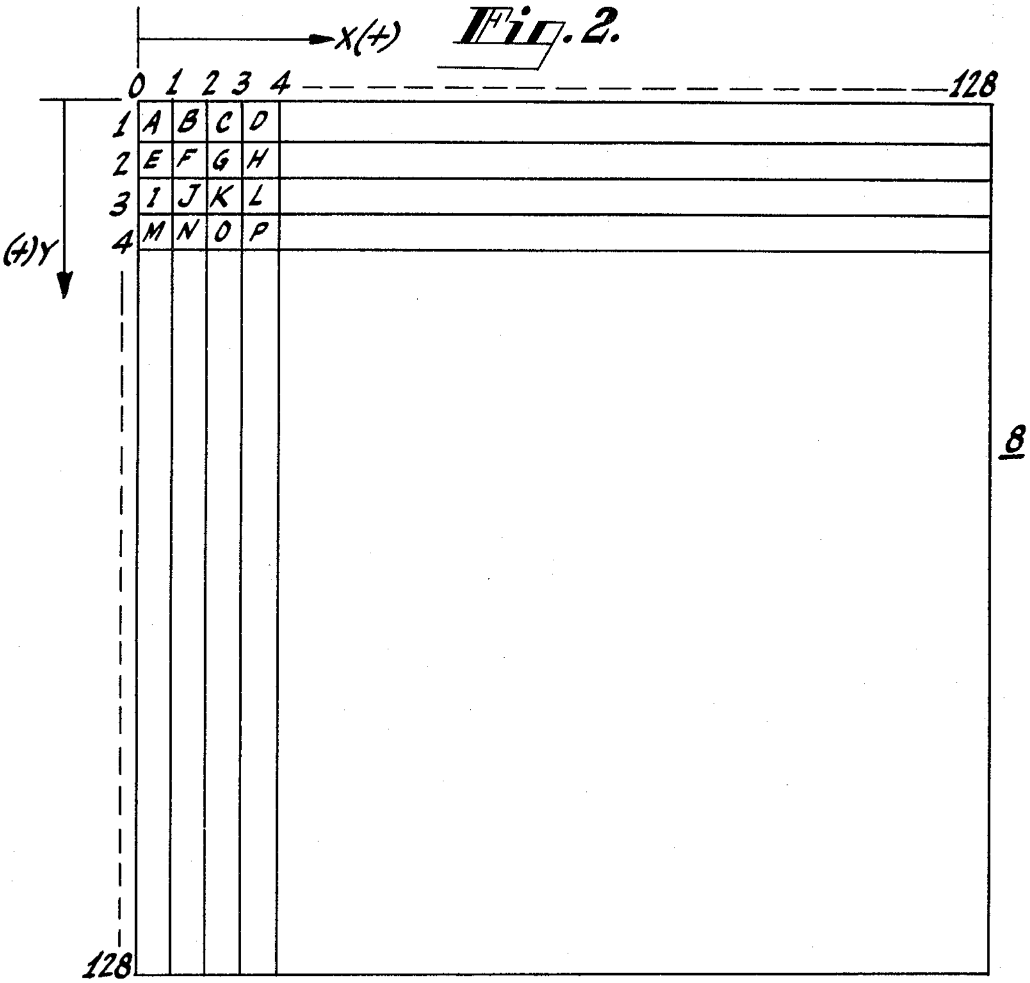
FIG. 2 is a diagram of how the generated characters may be displayed on the face of a display device.
FIG. 3 is a table which illustrates a method of coding useful in the practice of the invention.

Assume that the computer transmits this information in the ASCII code. This requires seven information bits and one even parity bit in each word. In addition, a start bit and two stop bits are transmitted for each word, making a total of 11 bits per word. Since there are seven information bits, one may specify $2^7$ or 128 locations in each of the horizontal (X) and vertical (Y) directions, at which the character selected may be displayed. FIG. 2 illustrates how the screen of display device 8 (FIG. 1) appears in such a situation.

Referring to FIG. 3, the table shows the coding required for specifying the character A for selection and for displaying A at the horizontal location 46 and the vertical location 50 on the display device 8 (FIG. 1).

Figure 4:
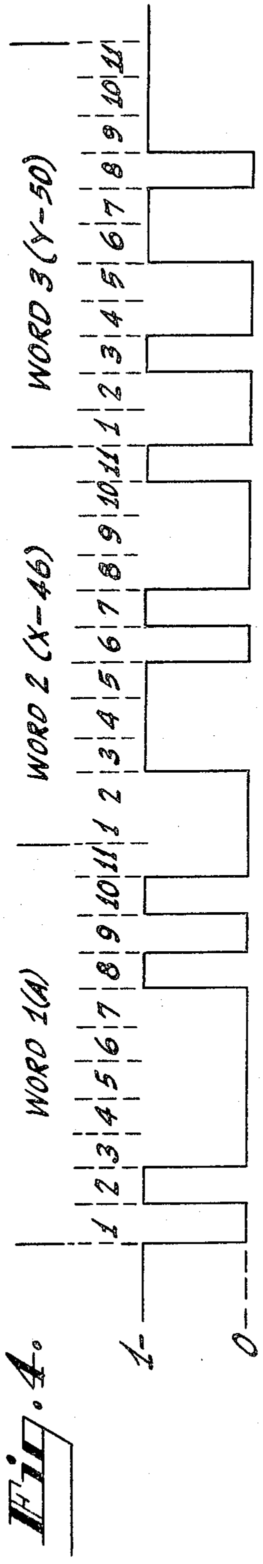
FIG. 4 is a binary word format useful in the practice of the invention.

Refer briefly to FIG. 4 which illustrates the structure of the three words transmitted from the computer. Word 1 specifies the character A, word 2 specifies the horizontal (X) location, and word 3 specifies the vertical (Y) location at which A is to be displayed. The format for each of the three words is identical. Bit 1 is a start bit and is at a level indicative of a binary "0." Bits 2–9 correspond to the $2^0$–$2^6$ bits and parity bit, respectively, of FIG. 3. Bits 10 and 11 are the stop bits. In word 1, bit 10 is a "1" and bit 11 is a "0," which is indicative of the next word specifying the horizontal location at which the character selected is to be displayed. In word 2, bit 10 is a "0" and bit 11 is a "1," which is indicative of the next word specifying the vertical location at which the selected word is to be displayed. In word 3, bits 10 and 11 are both "1," which is indicative of the end of the data bit sequence.

Figure 5:
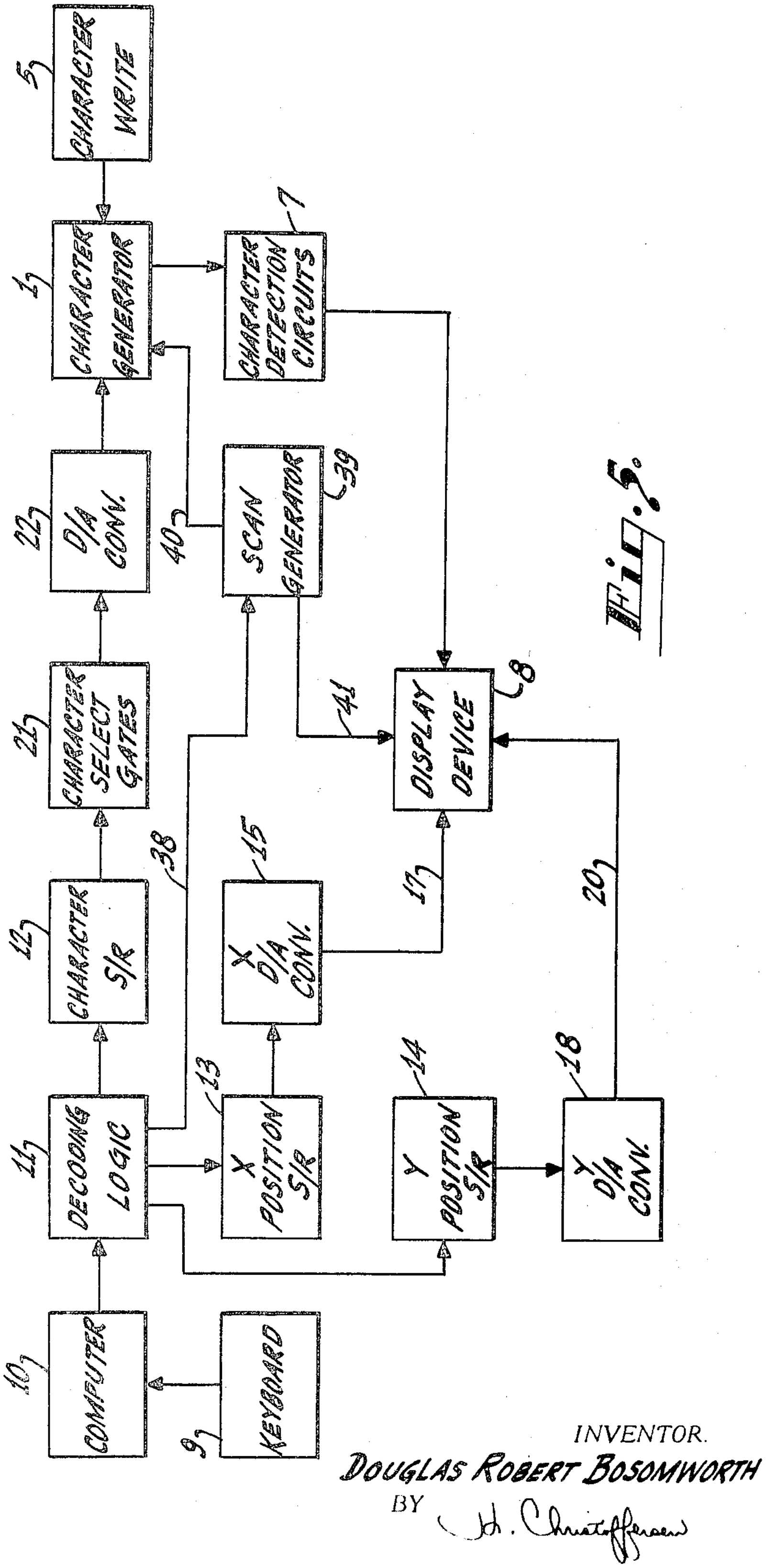
FIG. 5 is a block diagram of logic circuits which may embody the invention.

FIG. 5 is a block diagram of a system which may be used for the selection of and display of a character. A keyboard 9 may be used to load data into a computer 10. The computer 10 transmits the three words described above to decoding logic 11 which, for example, may comprise standard counters and gates. The word 1, character information, is transmitted to a character shift register (S/R) 12. Word 2, horizontal position, and word 3, vertical position, are transmitted to X position shift register (S/R) 13 and Y position shift register (S/R) 14, respectively. In the present application, the function of S/R's is basically conversion of serial binary data to a parallel binary format.

The parallel binary output signals from X S/R 13 are coupled in parallel via a multiconductor cable (shown in the figure as a single line) to the input terminals of a D/A converter 15 which converts the binary data to an analog voltage which is coupled to the X positioning coil 16 (FIG. 1) via line 17. The parallel binary output signals from Y S/R 14 are coupled via a multiconductor cable (shown in the figure as a single line) in parallel to the input terminals of a D/A converter 18 which converts the binary data to an analog voltage which is coupled to the Y positioning coil 19 via line 20 (FIG. 1). These X and Y voltages position the electron beam of display device 8 to the area at which the selected character is to be written.

The binary output signal from the character S/R 12 (FIG. 5) is coupled in parallel to a plurality of character select gates 21. The select gate corresponding to the character selected, in this case A, produces a binary "1" output signal which is coupled to one of a plurality of input terminals of a D/A converter 22. The converter 22, in response to the output signal, positions the electron beam of the character generator, cathode ray tube 1, over the selected character.

Figure 6:
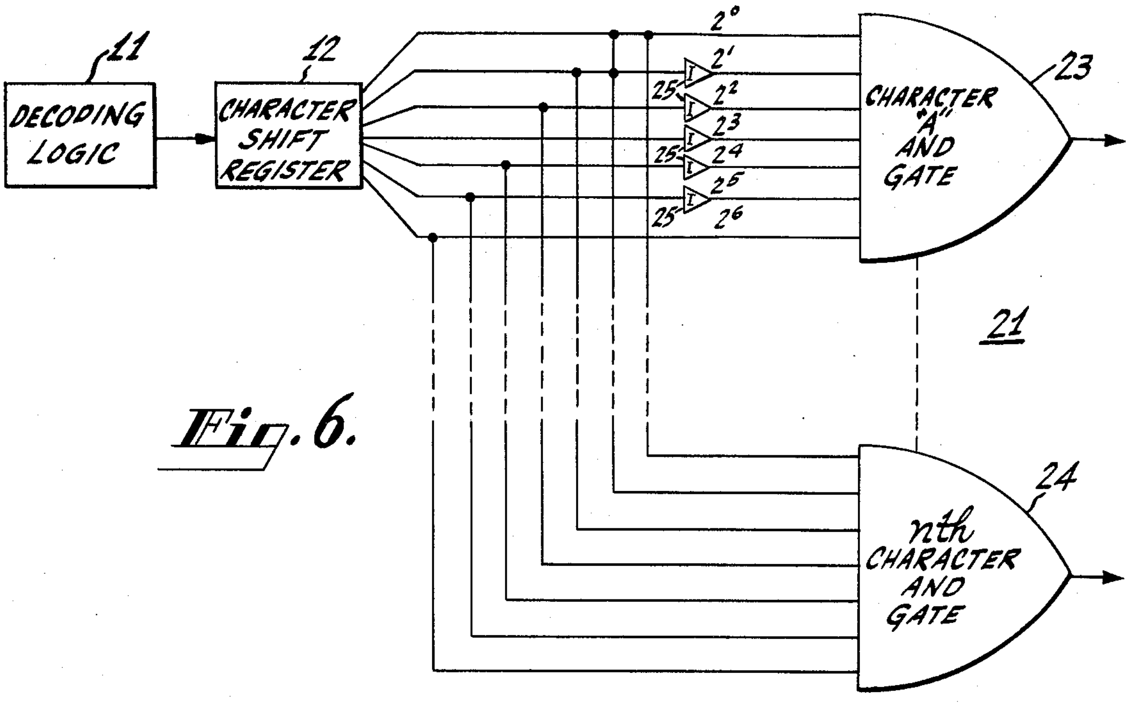
FIG. 6 is a detailed logic diagram of the character select gates of FIG. 5.

FIG. 6 illustrates a possible configuration of the character select gates 21 (FIG. 5). The binary word indicative of the selected character is coupled in parallel to the input terminals of the plurality of character select gates 21. For purposes of illustration, character A AND gate 23 and the *n*'th character AND gate 24 are illustrated. There is one such AND gate for each character stored on the face of cathode ray tube 1 (FIG. 1). The inverters 25 in series with five of the input leads to the AND gate perform their usual function. In the case of the word representing the character A, the $2^1$–$2^5$ bits are "0's", so that inverters are placed, as shown, to translate these bits to "1's". If at the same time, the remaining bits, that is, $2^0$ and $2^6$ also are "1's ", gate 23 is enabled indicating that A is selected.

Figure 7:
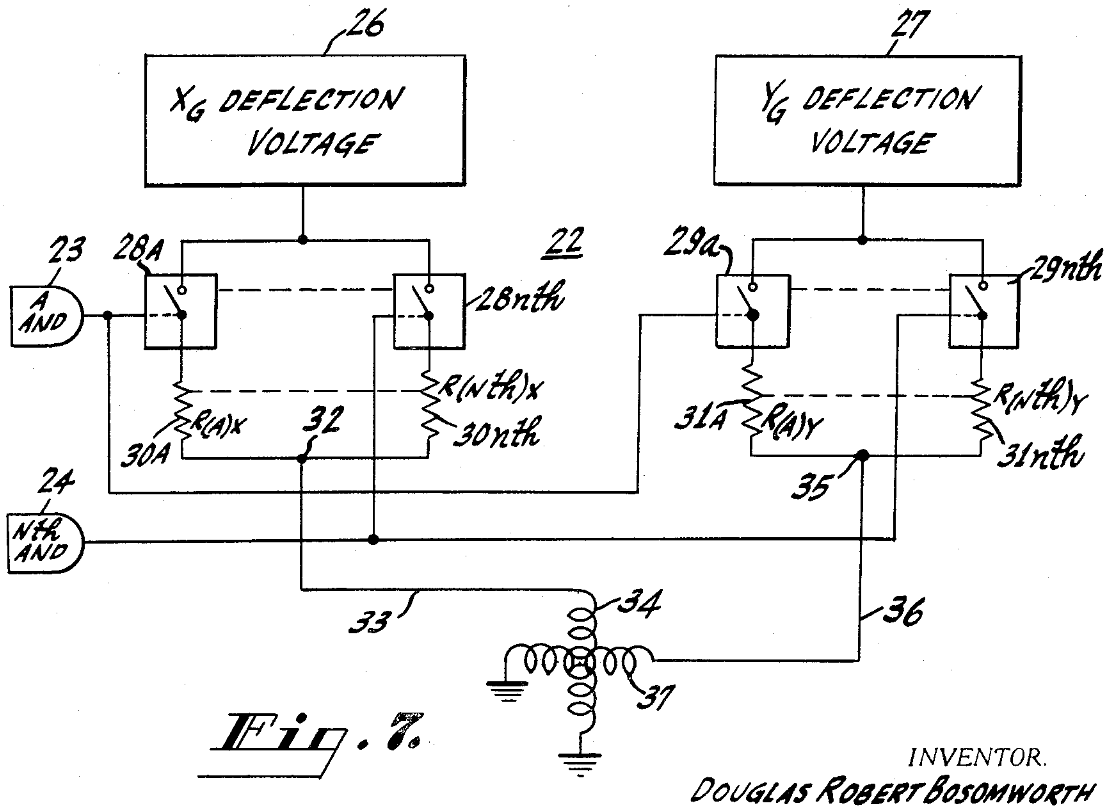
FIG. 7 is a detailed diagram of the character D/A converters of FIG. 5.

FIG. 7 is a detailed diagram of one possible embodiment of the D/A converter 22 (FIG. 5). There is a horizontal (X) deflection voltage source 26 and a vertical (Y) deflection voltage source 27. The voltage from source 26 is coupled to the input terminal of a plurality of switches 28 and the voltage from source 27 is coupled to the input terminal of a plurality of switches 29. The switches 28 and 29, for example, may be transistors. Each switch is controlled by the output signal of one of the plurality of character select gates 21 (FIG. 5). For example, switch 28A is closed when the output signal from gate 23 is a binary "1" and switch 28*n*'th is closed when the output signal from gate 24 is a binary "1." Connected to the output terminal of each of the switches 28 and 29 is one terminal of resistors 30 and 31, respectively. Each such resistor is of a different ohmic value. The other terminal of each of the resistors 30 is connected together at a common terminal 32 and is coupled via line 33 to horizontal positioning coil 34 of cathode ray tube 1 (FIG. 1). The other terminal of each of the resistors 31 is connected together at a common terminal 35 and is coupled via line 36 to vertical positioning coil 37 of cathode ray tube 1 (FIG. 1).

Assume character A has been selected. The output signal from gate 23 is a binary "1" which closes the switches 28A and 29A (FIG. 7), which couple deflection currents via resistors 30A and 31A to the positioning coils 34 and 37. The electron beam of cathode ray tube 1 (FIG. 1) is now positioned over the character A. As was described before, the electron beam of cathode ray tube 8 (FIG. 1) is at X position 46 and Y position 50 where the A is to be written.

Returning briefly to FIG. 5, the decoding logic 11 transmits a signal via line 38 which turns on a scan generator 39. The generator 39 produces a high frequency sinusoid or tickler voltage which simultaneously scans the selected character in cathode ray tube 1 and the area on cathode ray tube 8 at which the character is to be written. The sinusoid is coupled to cathode ray tubes 1 and 8 via lines 40 and 41, respectively.

The scan generator 39 is also illustrated in FIG. 1. The sinusoid is coupled via line 40 to the Y tickler coil 43 of cathode ray tube 1 and to the Y tickler coil 44 of cathode ray tube 8. Note that electrostatic tickler deflection might also be used. A ramp of current, time coincident with the sinusoid, is coupled via line 42 to the X tickler coil 46 of cathode ray tube 1 and is coupled via line 45 to the Y tickler coil 47 of cathode ray tube 8. The sinusoid and ramp are applied in time coincidence to both cathode ray tubes 1 and 8, however, the amplitude of the ramp and sinusoid applied to cathode ray tube 8 may be larger or smaller than the respective ones applied to cathode ray tube 1, whereby the size of the characters displayed in cathode ray tube 8 may be varied. The means for doing this may include amplifiers whose gain may be manually controlled located within block 39. An unblanking signal is applied concurrently via line 48 to the grid 49 of cathode ray tube 1.

Figure 8:
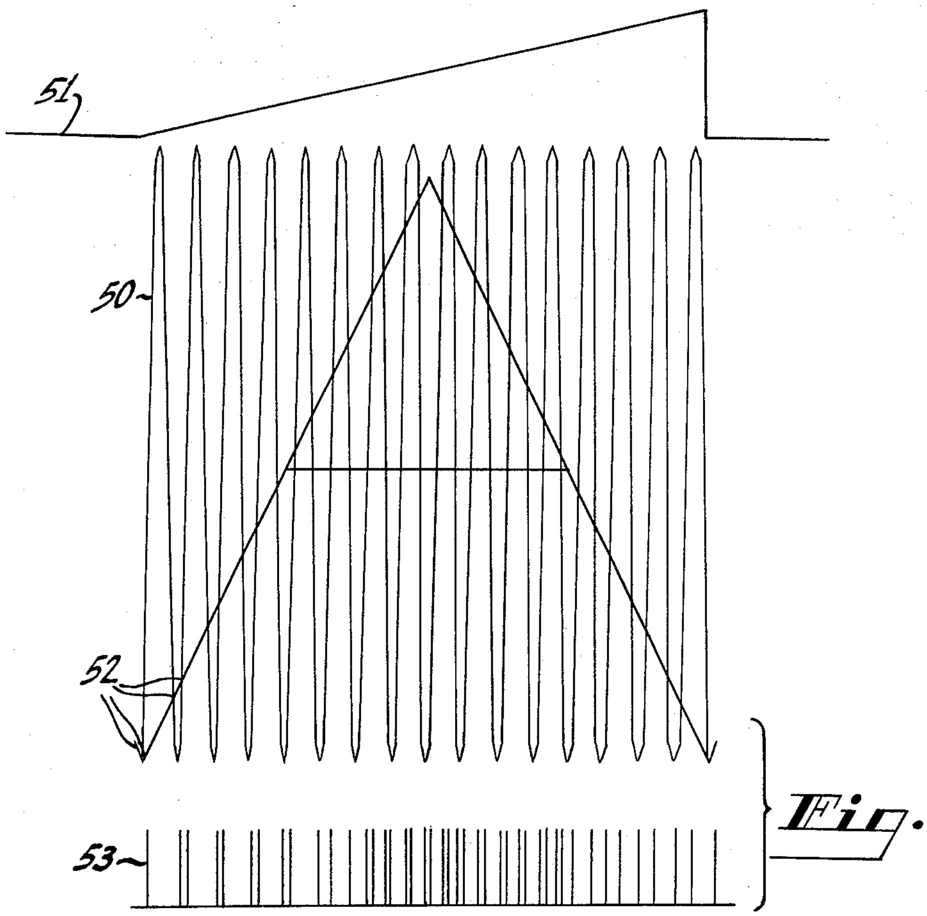
FIG. 8 illustrates how a selected character may be scanned in the practice of the invention.

FIG. 8 illustrates how a sinusoid 50 scans the character A. This is the sinusoid applied to the vertical tickler coil 43 of cathode ray tube 1. Waveshape 51 illustrates the ramp of current applied to horizontal tickler coil 46 of cathode ray tube 1. If the font is transparent on a colored or opaque background, a pulse of radiant energy in the first frequency band is transmitted during the time each segment of the character A is scanned by the sinusoid, as shown at 52. The pulses of radiant energy are converted to electronic pulses by the photodetection and amplifier circuits 7 (FIG. 1), as shown at 53, one pulse out for each pulse of radiant energy in. If the font is colored or opaque on a transparent background, the photodetection and amplifier circuits sense the radiant energy in the first frequency band during the scan period at all times except when the sinusoid 50 intersects the character A. Therefore, if an inverter were included in the circuit 7, the identical output signal 53 would be produced.

Returning to FIG. 1, the output signals 53 are coupled via line 54 to the grid 55 of cathode ray tube 8. Since a sinusoid and ramp of current are applied to the vertical 44 and horizontal 47 tickler coils, respectively, of cathode ray tube 8, concurrently with the application of the sinusoid 50 and ramp 51 to the tickler coils of cathode ray tube 1, the pulses 53 modulate the grid 55 of cathode ray tube 8 at the proper times whereby the character A is written. The character A appears absent discontinuities on the face of cathode ray tube 8 as the sinusoid 50 has a very high frequency. The frequency appears low in FIG. 8 for ease of illustrating how the output pulses 53 occur at each point the sinusoid 50 intersects the character A.

What is claimed is:

1. In combination:

a display device having a phosphor face and a photochromic layer deposited thereon;

means for concurrently applying the characters of one character font of a plurality of different character fonts to said photochromic layer; and means for reading selected ones of said applied characters.

2. A character generator comprising:

2 cathode ray tube having a phosphor face and a photochromic layer deposited thereon;

means for concurrently applying the characters of one character font of a plurality of different character fonts to said photochromic layer; and means for reading selected ones of said applied characters comprising means for raster scanning an electron beam over the selected ones of said applied characters.

3. In combination:

a display device having a face on which there are at least two face plate layers, an inner layer comprising material of the type which when excited emits radiant energy in a first frequency band, and an outer layer, which is adjacent to the inner layer comprising material of the type normally in a first condition in which it is capable of transmitting substantial energy in said first frequency band but which changes from said first to a second condition when excited by radiant energy in a second frequency band, said material, when in said second condition, having an absorption frequency in said first frequency band;

means for exciting, concurrently a plurality of areas of said outer layer with radiant energy in said second frequency band, whereby the plurality of areas change to said second condition; and means for selectively exciting particular ones of said areas of said inner layer, the selectively excited areas thereby emitting radiant energy in said first frequency band which is transmitted through any area of the outer layer adjacent to an excited area of said inner layer which is in said first condition and is substantially absorbed in any area of said outer layer adjacent to an excited area of said inner layer which is in said second condition.

4. In combination:

a storage device having a face on which the inner layer is a phosphor which emits radiant energy in a first frequency band of interest when excited and an outer layer, which is face-to-face with the inner layer, comprising a photochromic material initially transparent which becomes colored in response to radiant energy in a second frequency band of interest, the last-named radiant energy inducing in the colored area, an absorption frequency in said first frequency band of interest;

a plurality of masks, each mask comprising a plurality of characters and symbols;

means for projecting radiant energy in said second frequency band of interest through solely one of said plurality of masks for concurrently causing the characters and symbols contained therein to be stored on said photochromic layer; and means for selectively reading the characters and symbols stored on said photochromic layer.

5. The combination claimed in claim 4, the means for selectively reading comprising means for exciting said phosphor whereby said phosphor emits radiant energy in said first frequency band of interest, which is absorbed in the colored area and transmitted through the transparent area of said outer layer.

6. The combination claimed in claim 5, including means responsive to the radiant energy transmitted through said outer layer for producing an electrical signal.

7. In combination:

a storage device having a face on which the inner layer is a phosphor which emits radiant energy in a first frequency band of interest when excited and an outer layer deposited on the inner layer, which comprises a photochromic material, initially transparent but which becomes colored in response to radiant energy in a second frequency band of interest, inducing in the colored area an absorption frequency in the first frequency band of interest;

a plurality of masks, each mask comprising a plurality of characters and symbols;

means for projecting radiant energy in said second frequency band of interest through one of said plurality of masks and onto said photochromic layer for concurrently coloring selected areas of said photochromic layer whereby the characters and symbols of said one mask are stored on said photochromic layer; and means including said phosphor for selectively reading the stored characters and symbols.

8. A character generator whose font of characters quickly can be changed comprising, in combination:

a storage type cathode ray tube formed with a face capable of optically storing a font optically projected thereon and including means for raster scanning the electron beam thereof over any character stored in the font;

a plurality of masks formed with different fonts;

means for projecting light through the one of said masks having a desired font onto said face for causing said font to be stored; and light sensing means for receiving light from said face when a character in the font stored in said face is raster scanned by said electron beam.

9. The combination claimed in Claim 8, including a second cathode ray tube whose raster scanning electron beam is synchronized with the raster scanning electron beam of said storage type cathode ray tube; and means responsive to the sensing of light by said light sensing means for modulating said second cathode ray tube's electron beam.

* * * * *